United States Patent [19]
Asher

[11] Patent Number: 4,632,517
[45] Date of Patent: * Dec. 30, 1986

[54] CRYSTALLINE COLLOIDAL NARROW BAND RADIATION FILTER

[75] Inventor: Sanford A. Asher, Pittsburgh, Pa.

[73] Assignee: University of Pittsburgh, Pittsburgh, Pa.

[*] Notice: The portion of the term of this patent subsequent to Dec. 9, 2003 has been disclaimed.

[21] Appl. No.: 622,842

[22] Filed: Jun. 21, 1984

Related U.S. Application Data

[63] Continuation-in-part of Ser. No. 559,437, Dec. 8, 1983.

[51] Int. Cl.[4] .................. G02B 26/00; G02B 5/18; G01J 3/44
[52] U.S. Cl. .................. 350/362; 350/162.17; 350/162.24; 356/303; 356/334
[58] Field of Search .......... 350/359, 362, 363, 162.11, 350/162.17, 162.2, 162.23, 162.24; 356/326, 328, 331, 332, 333, 334, 303; 340/783

[56] References Cited

U.S. PATENT DOCUMENTS

| | | | |
|---|---|---|---|
| 3,341,274 | 9/1967 | Marks | 350/362 |
| 3,664,742 | 5/1972 | Witte et al. | 356/332 |
| 4,078,856 | 3/1978 | Thompson et al. | 350/362 |
| 4,261,653 | 4/1981 | Goodrich | 350/362 |
| 4,365,156 | 12/1982 | Gulovchenko et al. | 356/333 |
| 4,451,412 | 5/1984 | Loiseaux et al. | 350/162.24 |
| 4,453,805 | 6/1984 | Ashkin et al. | 350/162.24 |

Primary Examiner—Bruce Y. Arnold
Attorney, Agent, or Firm—Reed Smith Shaw & McClay

[57] ABSTRACT

A narrow wavelength band filtering device is provided by forming a highly ordered crystalline colloidal structure within a cell. The crystalline colloidal structure is relatively thin and has substantially planar and substantially parallel surface portions. The crystalline colloidal structure is formed by dispersing electrically charged particles, e.g., polystyrene spheres, within an appropriate solvent.

The filtering device of the present invention may form the basis for a mechanically simple and highly efficient monochromator, as well as find application in an improved system for investigating the Raman and/or emission spectra of selected sample materials. In addition, a novel multiple wavelength atomic absorption or emission spectograph is provided utilizing the filter device of the present invention.

15 Claims, 10 Drawing Figures

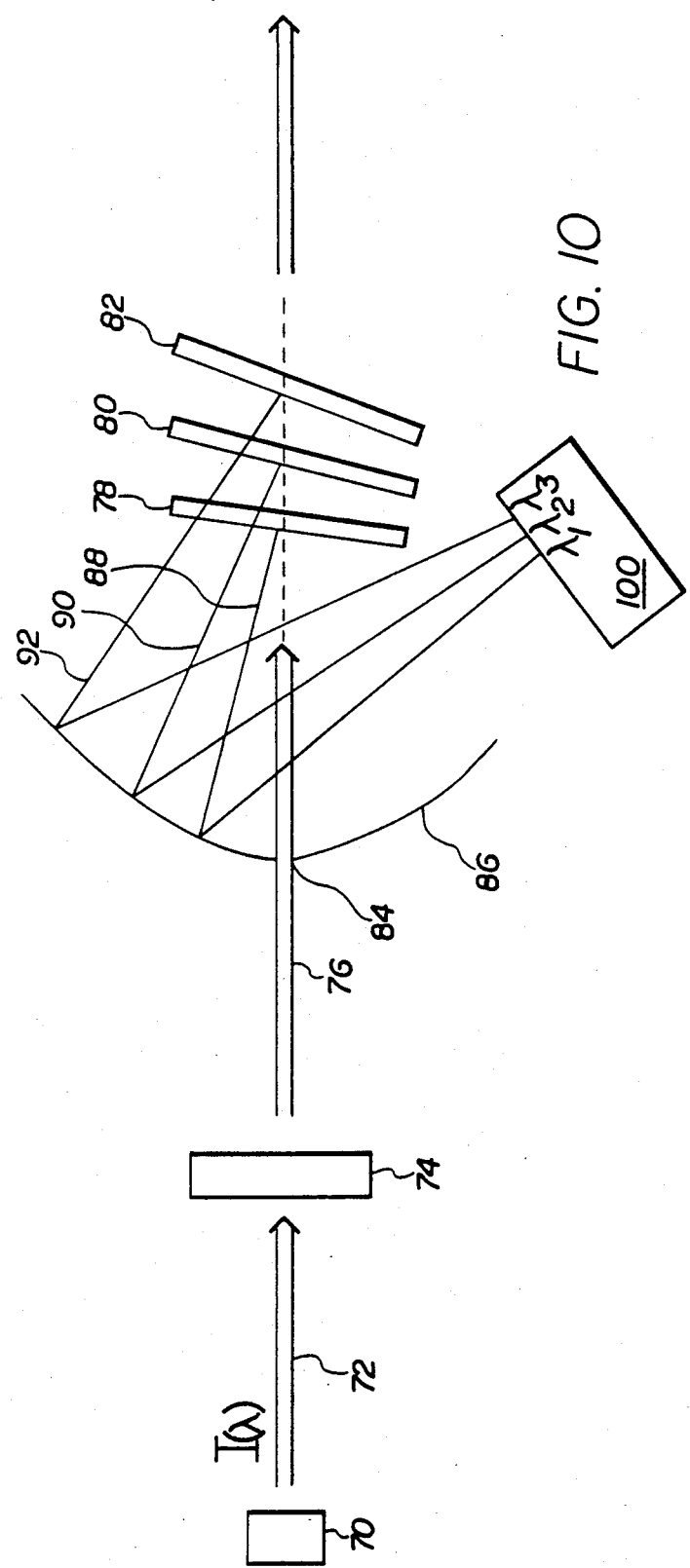

CRYSTALLINE COLLOIDAL NARROW BAND RADIATION FILTER

RELATION TO OTHER APPLICATIONS

This application is a continuation-in-part of pending U.S. patent application Ser. No. 559,437, filed Dec. 8, 1983.

ACKNOWLEDGEMENT

The invention described herein was made in part during the course of work under sponsorship by the Commonwealth of Pennsylvania acting through the Board of the Ben Franklin Partnership Fund and the MPC Corporation.

FIELD OF THE INVENTION

The present invention relates generally to filters which are used to select and/or reject predetermined frequencies of electromagnetic radiation.

The invention also relates to crystalline colloidal materials in which electrically charged particles form an ordered dispersion in a selected solvent.

DISCUSSION OF THE TECHNICAL PROBLEM

It is recognized in the literature that colloidal solutions of polystyrene spheres in various solvents can form crystalline structures having lattice spacing comparable to the wavelength of ultraviolet, visible and infrared radiation. Bragg diffraction techniques have been used to examine these polystyrene sphere crystal with a view toward identifying their interparticle spacing, lattice parameters and phase transitions. However, such studies were conducted for research purposes and generally yielded broad diffraction peaks and relatively modest levels of attenuation. Such results were useful for research purposes, but they failed to suggest any practical application for crystalline colloidal structures.

It is desirable in a variety of different endeavors to be able to filter out narrow band of selected wavelengths from a broad spectrum of incident radiation, while permitting the transmission of the adjacent wavelengths. High spectral purity commerical monochromators which are available for this purpose generally use a plurality of gratings and prisms. However, such devices are extremely complex, bulky and expensive, e.g., with costs in excess of $20,000, and generally have the effect of attenuating a considerable portion of the adjacent wavelengths which are to be transmitted.

Another device producing a similar end result is marketed as a Raman Notch Filter by Omega Optical, Inc. of Brattleboro, Vt. This device operates by passing a well-collimated beam of radiation to a first dielectric bandpass filter, where a percentage of the particular narrow wavelength band to be filtered to transmitted, while adjacent wavelengths are reflected. The reflected beam is directed to second, third and fourth dielectric bandpass filters, each "transmitting out" additional portions of the particular narrow wavelength band. Although useful in particular applications, the device is relatively complex, is not tunable to be operable for a range of different wavelengths, and the proper functioning of the device is restricted to use with well-collimated beams of radiation incident at precise angles to the device.

It would be advantageous to have a device which was able to selectively filter out wavelengths to a highly efficient degree, which did not attentuate desired wavelengths to a significant degree, which is tunable to filter a range of different wavelengths and which is simple, lightweight, and relatively inexpensive.

SUMMARY OF THE INVENTION

The present invention provides a simple and relatively inexpensive narrow band radiation filter which selectively and effectively filters a narrow band of wavelengths from a broader spectrum of incident radiation, while transmitting adjacent wavelengths to a high degree. For example, a filter can be produced in accordance with the present invention which filters out greater than 99.99% of 40A wide wavelength band, while transmitting more than 90% of the intensity of remaining wavelengths.

The invention includes a crystalline colloidal structure which is formed with a pair of substantially planar and parallel outer surfaces. The crystalline colloidal structure includes a lattice spacing and a degree of order sufficient to Bragg diffract a narrow wavelength band with a high rejection ratio, e.g., greater than 99%. The crystalline colloidal structure is preferably formed of electrically charged polystryene spheres in an appropriate solvent, and in one preferred embodiment, may be less than about one millimeter thick between the planar and parallel outer surfaces.

The filtering device of the present invention is tunable by adjusting the angle of incidence between the broad spectrum of radiation to be filtered and the planar and parallel faces of the crystalline colloidal structure. The filter device is also tunable by creating a lattice spacing gradient in the crystalline colloidal structure and varying the sphere concentration.

The filtering device of the present invention may form the basis for a mechanically simple and highly efficient monochromator, as well as find application in an improved system for investigating the Raman and/or emission spectra of selected sample materials. In addition, a novel multiple wavelength atomic absorption or emission spectrograph is provided utilizing the filter device of the present invention.

DESCRIPTION OF THE DRAWING

FIG. 10 is a schematic view of a novel atomic absorption or emission spectrograph utilizing the filter device of the present invention.

DESCRIPTION OF PREFERRED EMBODIMENTS

Figure 1:
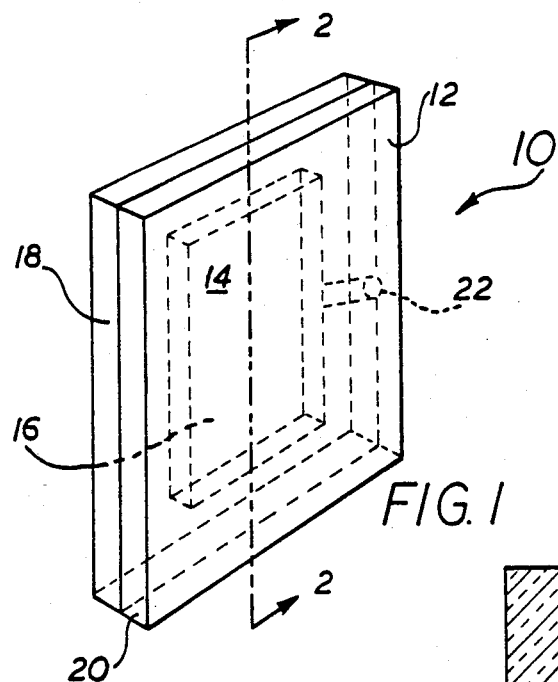
FIG. 1 is a perspective view of a narrow band filter incorporating features of the present invention.
Figure 2:
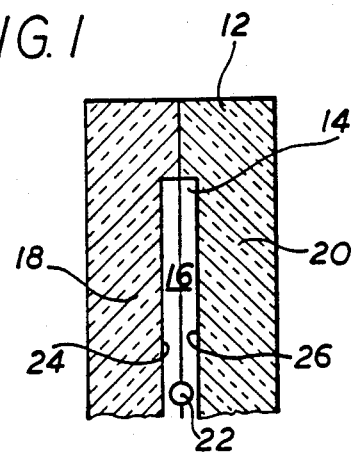
FIG. 2 is a view taken along line 2—2 of FIG. 1.

With reference to FIGS. 1 and 2, there is shown a filtering device 10 illustrating features of the present invention. Filtering device 10 includes a cell 12 having a chamber 14 for containing a quantity of a crystalline colloidal structure 16 therein. As best shown in FIG. 2, cell 12 may be conveniently formed of a pair of members 18 and 20 which are secured together at least about their peripheral surfaces, one or both of members 18 and 20 having an inner recess area which forms chamber 14. An inlet port 22 may be conveniently provided for use in supplying the chamber 14 with the material which forms crystalline colloidal structural 16.

Although not limiting to the invention, in the embodiment shown in FIGS. 1 and 2 the chamber 14 includes opposite surfaces 24 and 26 which are substantially planar and substantially parallel to one another. Preferably, the opposite surfaces 24 and 26 are spaced apart a distance of between about 10 micrometers and about 1 centimeter, most preferably less than 1 millimeter. As will be discussed more fully below, the filtering characteristics of filtering device 10 may be varied by controlling the spacing between surfaces 24 and 26.

Although not limiting to the invention, it is preferred that cell 12 be formed of a material which does not have the effect of leeching ions from the material introduced therein, because the formation of crystalline colloidal structure 16 depends upon electrical interactions between the electrically charged particles which form its lattice structure. Quartz, plastic materials such as plexiglass, and coated glass have been successfully used to form cell 12.

Filtering device 10 is formed by introducing a prepared fluid into the chamber 14 of cell 12 through inlet port 22. The fluid introduced into chamber 14 forms a crystalline colloidal structure 16 under suitable temperature conditions to be described below. The lattice order and spacing of the crystalline colloidal structure 16 formed within chamber 14 serves to Bragg diffract selected wavelength bands of electromagnetic radiation incident thereon, and thereby effectively filters such wavelength bands from a broader spectrum of wavelengths in which they reside.

The fluid introduced into chamber 14 generally consists of a solvent which contains a quantity of a selected material which is capable of forming an ordered dispersion in the solution. Although not limiting to the invention, the solvent may be substantially aqueous, or it may be benzene, ethylene glycol, dioxane, methanol, acetonitrile, DMSO, benzyl alcohol or any similar material.

The selected material in the solvent is generally a quantity of electrically charged particles, preferably a quantity of polystyrene spheres, although the invention would not appear to be limited to the use of either spherical shapes or polystyrene. Any material capable of forming an ordered dispersion in the solvent could find application in the practice of the present invention.

The preferred polystyrene spheres useful in the practice of the invention are of a substantially homogeneous size and electrical charge, in order that the optimum degree of ordering can be realized in the resulting lattice. As will be discussed more fully below, the higher the ordering in the lattice structure, the narrower the wavelength band which may be filtered with filtering device 10.

Sphere diameters ranging from about 0.01 $\mu$m. to about 1.0 82 m. may be used in the present invention, with diameter uniformity in a given sample preferably being maintained within 5% of the average. Samples of appropriate polystyrene spheres are available from Dow Diagnostics of Indianapolis, Ind.

PREPARATION OF THE CRYSTALLINE COLLOIDAL STRUCTURES

Polystyrene spheres having a sphere diameter indicated to be 0.109 $\mu$m. with a standard deviation of 0.0027 $\mu$m. may be commercially obtained from Dow Diagnostics. The spheres are cleaned of electrolyte and surfactant impurities by dialysis against a bath of doubly distilled water containing mixed bed ion exchange resin. After dialysis, the material may be stored as an approximately 10% by weight suspension over ion exchange resin obtainable from Bio-Rad as Analytical Grade AG501X8 mixed bed resin. The ion exchange resin should be cleaned prior to use through a procedure similar to that taught by Vanderhoff et al. in *J. Colloid Int. Sco.*, 1968, 28, 336–337.

The polystyrene sphere suspension is next diluted with deionized, doubly distilled water and placed within the cell 12. The cell 12 is sealed and placed in a room temperature water bath to allow the sample within to crystallize, preferably in a constant temperature and perturbation-free environment.

As the crystalline colloidal structure 16 forms in cell 12, geometric ordering of the crystalline structure apparently begins with respect to the surfaces 24 and 26 adjacent the surfaces 24 and 26 and extends therefrom into the central portions of the chamber 14. As an alternative to such surface initiation of the crystal formation process, it has been determined that formation can be initiated at a selected position within cell 12 by introducing a small quantity of ion exchange resin to the selected position, about which nucleation can begin. An increased degree of ordering may be realized through such a technique. Crystal formation is evidenced by a change in appearance of cell 12 from cloudy to irridescene.

After the crystalline colloidal structure 16 forms within cell 12, the cell 12 can be reasonably handled and transported without adversely affecting the integrity of the crystalline colloidal structure 16. While the crystalline colloidal structure 16 can be caused to "melt" into an amorphous structure if subjected to elevated temperatures, the lattice spacing of the crystalline colloidal structure 16 may also be affected by temperature increases short of those which will "melt" the crystalline structure. Likewise, the lattice spacing may also be altered (and controlled) by the imposition of an electric field upon the cell, because the lattice structure exists largely due to electrical repulsive forces between the polystyrene spheres. Because the wavelengths which are Bragg diffracted by the crystalline colloidal structure 16 are directly related to the lattice spacings thereof, the filter device 10 according to the present invention may be "tunable" for a specific wavelength band by controlling temperature and/or by controlling external electric fields operating on the filtering device 10. At elevated levels, an external electric field could "melt" the crystalline colloidal structure into an amorphous structure which would not serve as a filtering device. In this manner, it is possible that the filtering device 10 of the present invention could be switched on and off, if desired.

It has also been determined that an electric field may be useful during the formation process of crystalline colloidal structure. For example, an a.c. voltage of less than about 100 volts has been applied to the faces of cell 12 during formation of crystalline colloidal structure 16 to produce a more highly ordered crystalline structure which has greater stability and improved filtering characteristics. In addition, it has been determined that the addition of a small quantity of a detergent material, e.g., sodium dodecylsulfate, may improve the ordering of crystalline colloidal structure 16.

The concentration of the polystyrene spheres within the selected solvent material will have a direct impact upon the lattice spacing of any crystalline colloidal structure generated. For a given total volume of sample, as the polystyrene sphere concentration increases, the lattice spacing in the crystalline colloidal structure decreases. Although not limiting to the invention, a high degree of lattice ordering has been determined to be attainable with polystrene sphere concentrations between about 0.9% and about 5%, and it is contemplated that similar ordering can be achieved with sphere concentrations between 0.01% and 10%.

The bandwidth of the narrow wavelength band which is Bragg diffracted by the present invention is believed to be a function of the degree of ordering of the polystyrene within the crystalline colloidal structure 16, the diameter of the spheres, and the difference between the refractive indices of the spheres and the solvent. The narrowest bandwidth generally occurs in the most highly ordered system. In turn, the degree of ordering may be affected by the thickness of the sample, i.e., by the space between the inner surfaces of wall members 18 and 20. Samples which are too thin, e.g., less than about 50 μm., may have too few sphere layers to minimize the width of the narrow wavelength band which is filtered. Likewise, in thick samples, e.g., greater than 2 millimeters, the spheres ordering may diminish and the width of the wavelength band which is Bragg diffracted correspondingly increase.

Bandwidth may also be affected by the refractive index of the solvent selected, and with relatively thick, highly ordered samples, e.g., 2.0 mm., it may be desirable to select a solvent having a refractive index close to the refractive index of the crystalline colloidal structure formed therein in order to minimize bandwidth. Bandwidths less than about 1A may be attainable through use of such techniques. In such application, samples having a thickness up to about 1 centimeter may prove useful.

EXAMPLE

The crystalline colloidal structure 16 described herein is exemplary of one useful in a filtering device 10 which Bragg diffracts a relatively narrow wavelength band with a high rejection ratio.

A dispersion of polystyrene spheres was prepared in the manner discussed above, and diluted with doubly distilled water to a concentration of about 3.0%.

The sample was sealed within a plexiglass cell 12 having chamber dimensions of about 40 mm.×40 mm.×0.4 mm. and a crystalline colloidal structure formed therein, as evidenced by a change from a cloudly appearance to an irridescent appearance.

The cell 12 was utilized as a narrow band wavelength rejection filter in a Raman spectroscopy apparatus and was determined to Bragg diffract about 99.99% of the light at the maximum of a 50A wide wavelength band centered at 4880A, while passing about 90% of the light at adjacent wavelengths.

The usefulness of the filtering device 10 as a narrow band filter was quite unexpected, inasmuch as it proved more effective than the highly complex and expensive monochromators which had been used for similar purposes prior to the present invention. While prior monochromators were capable of filtering out a similar percentage of a selected narrow band of wavelength, they commonly also filtered out large percentages of the remaining wavelengths.

OPERATION OF THE FILTER

Figure 3:
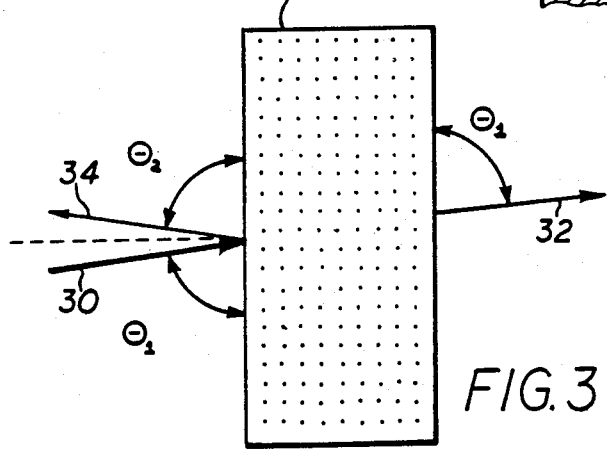
FIG. 3 is a schematic view illustrating the filtering function of the narrow band filter of the present invention.
Figure 4:
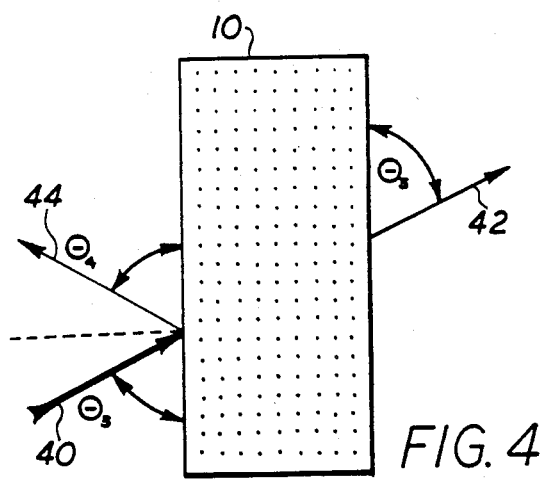
FIG. 4 is a schematic view similar to the view of FIG. 3, illustrating the filtering function at a different angle of incidence.
Figure 5:
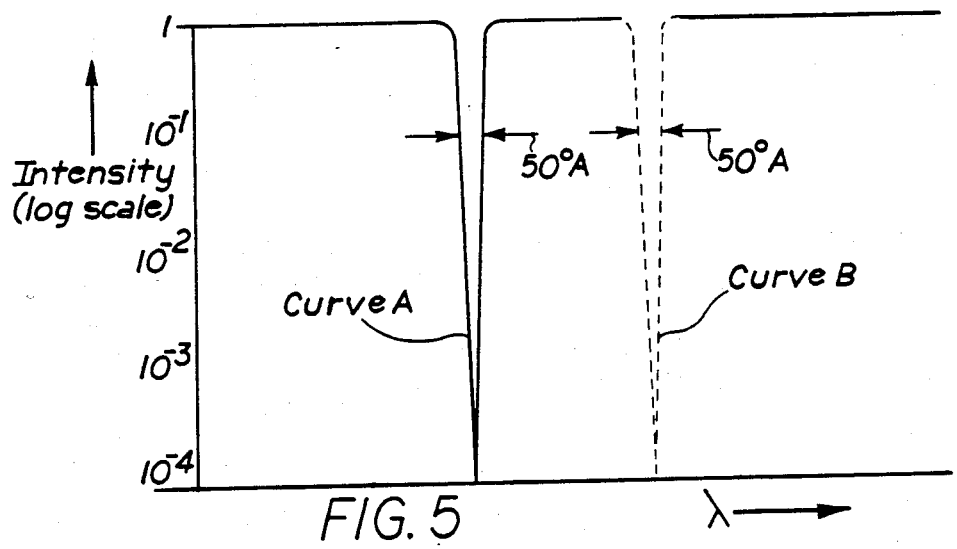
FIG. 5 is a spectrum indicating the narrow wavelength band filtered in FIGS. 3 and 4.

With reference to FIGS. 3, 4 and 5, the operation of filtering device 10 as a function of the angle of incidence of the electromagnetic radiation is illustrated. In FIG. 3, a beam 30 of electromagnetic radiation is incident upon filtering device 10 at an angle of $\theta_1$, a transmitted beam 32 departs the filtering device 10 at a substantially equal angle $\theta_1$, and a beam 34 of a narrow wavelength band is Bragg diffracted from the filtering device 10 at an angle $\theta_2$. In this manner, beam 34 is effectively filtered from beam 30, the wavelength of beam 34 satisfying the Bragg diffraction equation:

$$n\lambda = 2d \sin \theta_1$$

where d represents the lattice spacing within the crystalline colloidal structure 16 and n represents an integer.

Curve A of FIG. 5 illustrates that the wavelength band which is Bragg diffracted by the filtering device 10 according to the present invention may be quite narrow, e.g., 50 A in width.

In FIG. 4, a beam 40 of electromagnetic radiation is incident upon filtering device 10 at an angle $\theta_3$, which is smaller than angle $\theta_1$ of FIG. 3. The transmitted beam 42 departs the filtering device 10 at an angle substantially equal to $\theta_3$, and a beam 44 of a narrow wavelength band is Bragg diffracted from the filtering device 10 at an angle $\theta_4$. With reference to Curve B of FIG. 5, the central wavelength of the narrow wavelength band filtered by filtering device 10 is dependent upon the incident angle, as determined by the Bragg difraction equation. Accordingly, it will be appreciated that the filtering device 10 of the present invention is "tunable" to filter a range of different wavelength bands, by controlling and appropriately adjusting the orientation between the filtering device 10 and the incident electromagnetic radiation. In this manner, a single filtering device 10 has been found to be useful over 2000 Å intervals, e.g., for wavelength bands centered from about 4000 Å to about 6000 Å.

Further, it has been determined that crystalline colloidal structures 16 may be formed which has a continuous range of lattice spacing, for example, from the top to the bottom of a cell 12. In this manner, different segments of the filtering device 10 can be used to Bragg diffract different wavelength bands from a beam of incident electromagnetic radiation, thereby further increasing the "tunable" characteristic of the filtering device 10 of the present invention. A concentration gradient and corresponding lattice spacing gradient may be formed by introducing an extra amount of solvent to one end of a uniformly spaced lattice structure, permitting the solvent to partially diffuse into the sample, and then "freezing" the nonuniform condition, e.g., by polymerization techniques. A range of lattice spacing differing by as much as 100% has been generated within a cell 12 in this manner.

Filtering devices in accordance with the present invention are known to be operable from the infrared region down to the near ultraviolet region, e.g., about 300 nm., depending upon the lattice spacing generated in a given filtering device 10.

However, the invention is not determined to be limited to such wavelength ranges, for crystalline colloidal structures having lattice spacings greater and less than those presently being explored are readily forseeable, by appropriate selection of different lattice-producing spheres and solvents.

With continued reference to FIGS. 3 and 4, it should be appreciated that while most of the discussion herein has been directed to the ability of the filtering device 10 to filter out a designated narrow wavelength band from a beam of electromagnetic radiation, the invention is also applicable to situations in which the "filtered" narrow wavelength band is to be preserved and utilized. For example, in laser communication or range-finding applications, it may be necessary to separate an information-containing laser frequency from background illumination. The filtering device 10 according to the present invention can be utilized to "reflect" the desired laser wavelength band to a sheltered detection point while permitting the remainder of the wavelength spectrum to pass directly through the filter.

Figure 6:
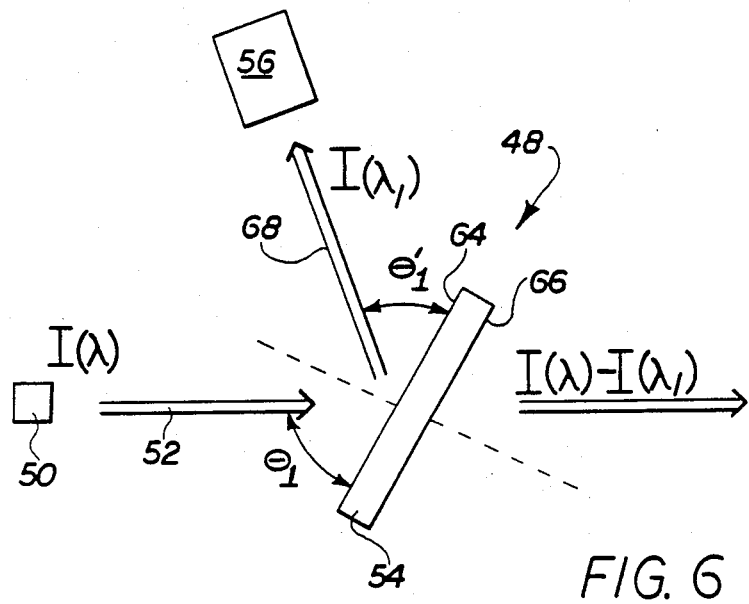
FIG. 6 is a schematic view of a novel slitless monochromator according to the present invention.
Figure 7:
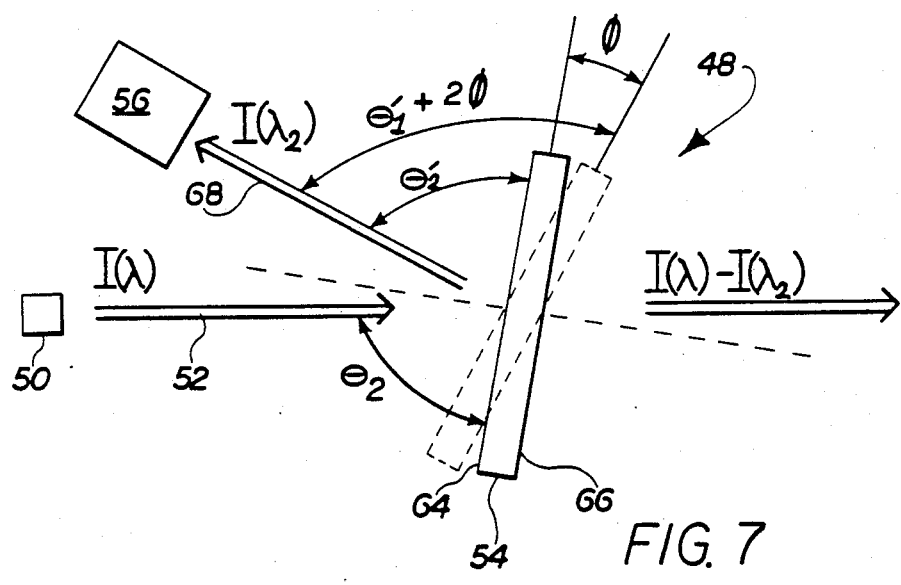
FIG. 7 is a second schematic view of the novel slitless monochromator according to the present invention, illustrating the wavelength scanning capability thereof.
Figure 8:
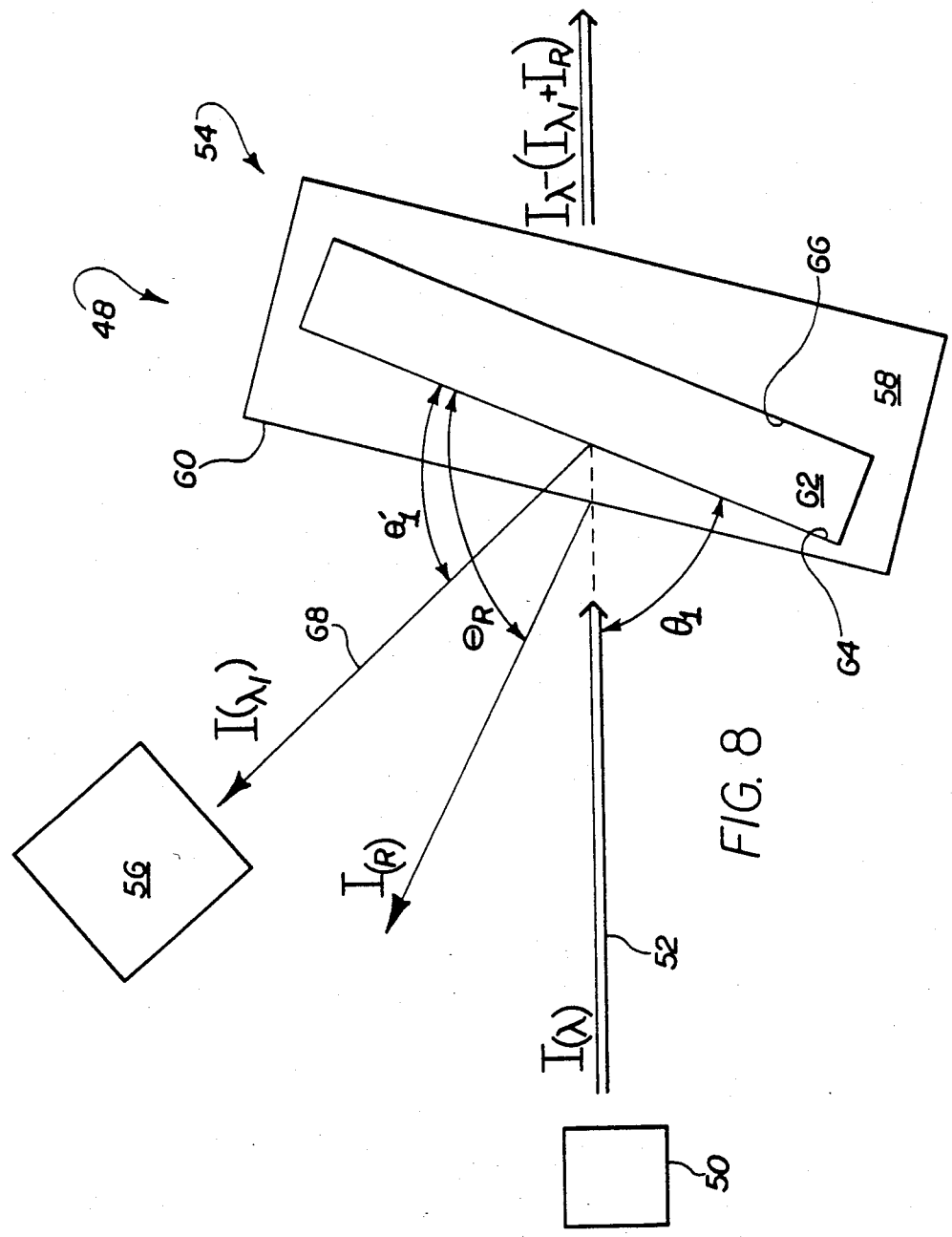
FIG. 8 is an enlarged and more detailed view of the filter device of FIGS. 6 and 7.

With reference to FIGS. 6–8, there is shown a novel slitless monochromator 48 in accordance with the present invention, including a source 50 of a collimated beam of incident radiation 52 having an intensity $l(\lambda)$, a filter member 54 and a detector 56. As best shown in FIG. 8, filter member 54 preferably includes an outer cell 58 having an outer surface 60 and an inner chamber 62 therein, the inner chamber 62 having substantially parallel and planar facing surfaces 64 and 66 along which a crystalline colloidal structure is formed in a manner previously discussed. Preferably, outer surface 60 is in a nonparallel relation to surfaces 64 and 66, for reasons to be more fully described below.

As shown in FIG. 6, the elements of monochromator 48 are preferably oriented such that radiation 52 from source 50 is incident upon filter member 54 to form an angle $\theta_1$ with the direction of surface 64, with detector 58 oriented to form an equal and opposite angle $\theta'_1$, with surface 64. As discussed above with respect to FIGS. 3 and 4, a particular wavelength $\lambda_1$ within radiation 52 will satisfy the Bragg diffraction condition with the lattice spacing within filter member 54, causing a beam 68 of wavelength $\lambda_1$ to diffract toward detector 56 with intensity $1(\lambda_1)$. With reference to FIG. 8, some portion $1_{(R)}$ of incident radiation 54 will also be reflected at outer surface 60 of filter member 54. However, by orienting outer surface 60 at a different angular relation to incident radiation 52 than surface 64, the reflection from surface 60 leaves at an angle $\theta_R$, which differs from $\theta'_1$, thereby assuring that detector 56 detects $1(\lambda_1)$ rather than the combination of $(\lambda_1)$ and $1_{(R)}$. In addition, to minimize $1_{(R)}$ it is preferred that outer surface 60 be coated with an anti-reflection coating, many of which are known in the art. Further, it is preferred that the refractive index of the material forming cell 58 be refractive-index matched with the crystalline colloidal structure therewithin to minimize reflections from the interface therebetween.

As best shown in FIG. 7, the monochromator 48 of the present invention may be conveniently designed to determine the intensity of each of the different wavelengths within incident radiation 52, by simultaneously and cooperatively rotating both filter member 54 and detector 56 relative to the direction of incident radiation 52. More particularly it will be appreciated from FIG. 7 that as filter member 54 is rotated through an angle $\phi$ to an angle $\theta_2$, a different wavelength will satisfy the Bragg diffraction condition and be diffracted from the filter member 54 at angle $\theta'_2$. Detection 56 may then be rotated through an angle $2\phi$ to be in position to detection intensity $l(\lambda_2)$. Thus, as filter member 54 and detector 56 are rotated through angles $\phi$ and $2\phi$, respectively monochromator 48 is able to scan the intensity of different wavelength intervals within $l(\lambda)$. Such an apparatus has a major advantage over other commercially available monochromators, because unlike such monochromators which use limiting apertures and slits and thereby substantially diminish the throughput to the detector, the monochromator 48 of the present invention utilizes the full intensity of incident radiation 52 and exhibits a greater efficiency for wavelength selection, and thereby provides for greater sensitivity, particularly in applications where a weak source of radiation is to be analyzed.

Monochromators of the type taught herein will find application in fluorescence measurements, Raman spectroscopy and various pump-probe techniques. Pump-probe techniques include photochemical transient absorption studies in which a pump beam of a particular wavelength excites a sample and a probe beam at another wavelength is used to monitor absorption changes. Another example would occur in a thermal grating experiment where a pump beam generates a thermal grating in a sample and a probe beam at a second wavelength is diffracted from the grating. Magnitude and temporal behavior of the diffracted intensity provides information concerning sample absorption and thermal diffusion, respectively. Monochromators according to the present invention will find application in such environments both to select the spectral region to be passed and to reject the pump wavelength. This is particulary the case in optical experiments where probe beam intensity is weak compared to the intensity of light scattered from the pump beam, or where signal intensity is weak compared to the intensity of the exciting beam, because the present monochromator provides substantially greater throughput signal (90%) of the desired wavelength than the double (10% throughput) and triple (3% throughput) monochromators currently in use in such applications.

EXAMPLE

Polypropylene microcentrifuge tubes were used as samples for Raman measurements. The Raman spectra were measured by using a Spectra-Physics model 164 Ar laser as the excitation source and a Spex 1401 double monochromator with 5000 Å blazed ruled gratings for wavelength dispersion. The 90° scattered light was collected and measured by using photon counting accumulation and detected by using an RCA C31034A-02 cooled photomultiplier. A DEC MIC 11 microcomputer interfaced to a steping motor scanned the monochromator and stored the data.

Figure 9:
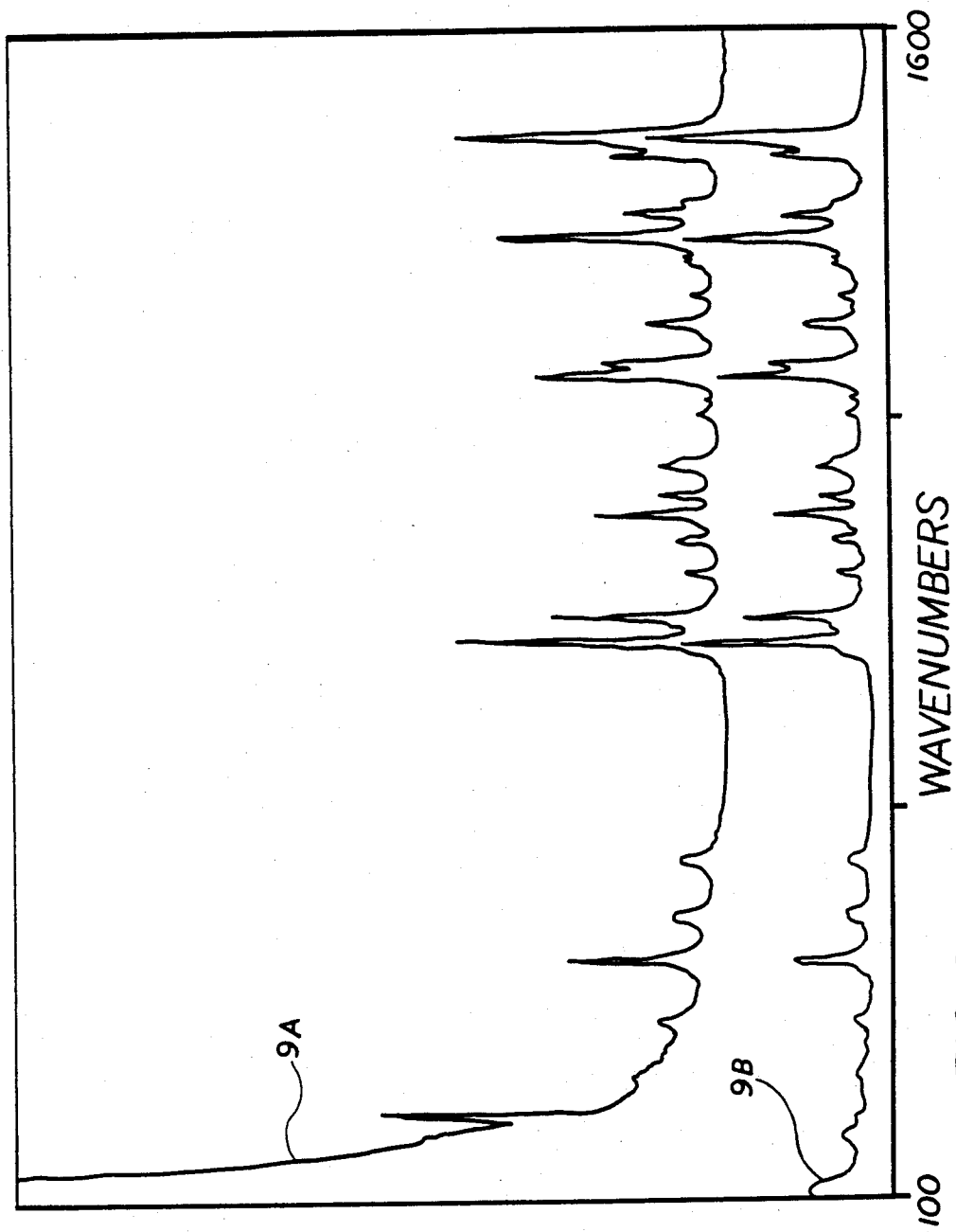
FIG. 9 is a graphic representation of the application of these filters in Raman spectroscopy.

FIG. 9, graph 9A, shows the Raman spectrum of polypropylene, a highly scattering material with numerous low frequency modes, excited with a laser of frequency of 5145 Å at 0.53 W of power. A high "Rayleigh wing" tail in the low frequency region of this spectrum obscures a low frequency peak at 171 cm$^{-1}$ and interferes with the measurement of a low frequency peak at 254 cm$^{-1}$. The region efficiency of the double monochromator in the apparatus in insufficient to totally reject the elastically scattered laser light. Normally a triple monochromator or holographic gratings would be required to efficiently reject the laser light and avoid interference in the low frequency Raman region. The strong sharp peak at 200 cm$^{-1}$ appears to be due to a grating ghost and not a laser plasma line since the introduction of a spike interference filter (5145 Å) in the laser beam did not result in significant attenuation of this peak.

A Raman spectrum of polypropylene utilizing the rejection filter of the present invention is shown in FIG. 9, graph 9B, for excitation with a laser of frequency of 5145 Å at 0.62 W of power (the spectra plotted on the same scale as 9A, but offset for clarity). The filter was placed between the collection and imaging lens of the Raman spectroscopy apparatus at the proper angle to reject the laser wavelength. No repositioning of the collection and imaging optics occurred after introduction of the filter. Because the filter selectively attenuates the "Rayleigh scattered light", the low frequency Raman peaks become clearly visible in the spectra. The grating ghost observed at 200 cm$^{-1}$ is also attenuated. Attenuation of the high frequency modes (600 cm$^{-1}$) due to the reflection at the filter air-plexiglass interface should be less than 10%. However, the spectrum shown in FIG. 9B indicates that the high frequency peaks are attenuated by about 20% presumably due to a displacement of the image of the collected scattered light off of the entrance slit to the monochromator due to refraction in the filter. The intensity of the high frequency Raman peaks can be increased by a slight repositioning of the collection optics to properly image the scattered light through the entrance slit of the monochromator. Attenuation of the low frequency peaks for this filter as calculated from the transmission spectra should be about 95% at 100 cm$^{-1}$ and about 74% at 200 cm$^{-1}$.

The utlity of this filter for Raman spectral studies is thus demonstrated for a highly scattering sample. Only a simple high dispersion single monochromator or spectrograph would be required for Raman measurements if this filter were used as a Rayleigh rejection prefilter. This represents a significant savings both financially and in the time required to measure Raman spectra because of the decrease in the complexity of the monochromator required, and because of the increase in the throughput efficiency of the filter-single monochromator combination. For example, the throughput for the filter and a single monochromator will be about 30% in contrast to the characteristic 10% efficiency of a double monochromator and about 3% efficiency of a triple monochromator.

With reference now to FIG. 10 a very useful further application of the present invention as an atomic absorption or emission spectrograph is schematically illustrated. In the atomic absorption mode of operation, a source 70 is positioned to emit a beam of collimated radiation 72 of intensity l($\lambda$) toward and through a selected sample 74, the composition of which is to be determined. Sample 74 absorbs characteristic narrow wavelength lines from radiation 72 depending upon the atomic composition of the sample material, and an output beam 76 is directed therefrom toward a series or stack of filter elements 78, 80 and 82. Although not limiting to the invention, output beam 76 may be conveniently directed through an orifice 84 in a focusing arcuate mirror 86 prior to passage to filter elements 78, 80 and 82. As can be appreciated from a review of FIG. 10, filter elements 78, 80 and 82 are oriented at different angular positions relative to beam 76, such that each Bragg diffracts a different narrow wavelength band from beam 76 and passes substantially all of the remainder of beam 76 incident thereon. With reference to filter element 78, a beam 88 of a selected narrow wavelength band $\lambda$ and intensity l($\lambda_1$) is diffracted toward a segment of arcuate mirror 86, from whence it is focused and directed toward a discrete receiving point on a multichannel detector 100.

Substantially all of beam 76 except l($\lambda_1$) passes through filter element 78 to filter element 80, where a different selected narrow wavelength band 90 of wavelength $\lambda_2$ and intensity l($\lambda_1$) is Bragg diffracted toward arcuate mirror 86 and therefrom to a different discrete receiving point on multichannel detector 100. As more fully described above, the losses through each filter element may be minimized by utilizing known antireflective coatings on surfaces and by refractive index-matching the cell member and the crystalline colloidal structure contained within. Additionally, the width of the narrow wavelength bands diffracted may be controlled by refractive index-matching the solvent and the polystyrene (or other) spheres in the crystalline colloidal structure.

Filter element 82 functions in the same manner as filter elements 78 and 80 and is intended to be representative of a continuing series of filter elements which can be utilized to permit a simultaneous determination of the intensity of a large number of characteristic wavelength lines which indicate the presence (or lack) of different elements within sample 74. It is contemplated that forty or more filter elements could be conveniently stacked, and diffracted beams therefrom focused onto discrete receiving points of multichannel detector 100 simultaneously, thereby making available a quick and relatively inexpensive instrument for atomic analysis not heretofore known.

Arcuate mirror 86 could be spherical or aspherical, and indeed could be conveniently replaced with an appropriate lens system for focusing and directing toward multichannel detector 100, without departing from the intent of the present invention.

Likewise, the spectrograph of the present invention may be conveniently utilized in an emission mode of operation, by exciting sample 74, e.g., by heating or excitation by light, and by collimating and directing the radiation emitted therefrom toward filter elements 78–82. In this embodiment, as many elemental emission lines could be simultaneously measured as there are receiving points on multichannel detector 100, with the intensity of any emission wavelength indicating the concentration of particular element in sample 74.

Finally, it is within the scope of the present invention to form a filter device 10 having substantially parallel, non-planar outer surfaces in the crystalline colloidal structure, or alternatively, non-parallel planar outer surfaces therein. Thus, the present invention is not intended to be limited by the specific embodiments and applications described herein. Rather, reference must be made to the claims appended hereto.

What is claimed is:

1. A filtering device for separating a narrow wavelength band from a broader spectrum of electromagnetic radiation comprising:

a crystalline colloidal structure having a pair of substantially planar and parallel outer surfaces, said crystalline colloidal structure comprising a dispersion of electrically charged particles in a selected solvent wherein the refractive index of said selected solvent is within 0.1 of the refractive index of said electrically charged particles and having a lattice structure which has a lattice spacing and a degree of order sufficient to Bragg diffract greater than about 90% of the intensity of a wavelength band less than 50 Å in width while passing greater than about 50% of the intensity of wavelengths adjacent to said wavelength band, and cell means for containing said crystalline colloidal structure, said cell means including substantially transparent wall members which are adjacent to the outer surfaces of said crystalline colloidal structure and being formed of material which is substantially non-leeching of adjacent ions.

2. The filtering device as set forth in claim 1, wherein the refractive index of said wall members is substantially similar to the refractive index of said crystalline colloidal structure.

3. The filtering device as set forth in claim 2, further comprising:

an antireflective coating on at least portions of the outer surface of said wall members to minimize reflections therefrom.

4. A device for measuring the wavelength composition of a beam of incident radiation, comprising:

a diffraction element positionable in the path of said beam of incident radiation, said diffraction element including a crystalline colloidal structure having a pair of substantially planar and parallel outer surfaces positionable at a first predetermined angle to said path of said beam of incident radiation to diffract a narrow wavelength band of said beam of incident radiation from said diffraction element at a second predeterminable angle to said diffraction element while passing greater than fifty percent of the intensity of non-diffracted wavelengths in said beam through said crystalline colloidal structure; and detector means positionable along said second predetermined angle to receive said diffracted narrow wavelength band, said detector means including means for measuring the intensity of said diffracted narrow wavelength band.

5. The device as set forth in claim 4, further comprising:

means for rotating said crystalline colloidal structure relative to said beam of incident radiation to alter said first predetermined angle by an angular amount $\phi$; and means for moving said detector means along an arc relative to said diffraction element to a position an angular amount $2\phi$ from said second predetermined angle to receive a different narrow wavelength band of said beam of incident radiation which is diffracted theretoward by said diffraction element.

6. The device as set forth in claim 5, further comprising means linking said rotating means and said moving means to maintain relative angular movement of said crystalline colloidal structure and said detector means in a 1:2 ratio relative to the direction of said beam of incident radiation.

7. The device as set forth in claim 4, wherein said diffraction element comprises transparent cell means for housing said crystalline colloidal structure, said cell means including an exterior surface upon which said beam of incident radiation is incident which is nonparallel to said outer surfaces of said crystalline colloidal structure, wherein said cell means is formed of a material having an index of refraction similar to the index of refraction of said crystalline colloidal structure to minimize reflections of said beam of incident radiation from the interface of said cell means and said crystalline colloidal structure.

8. The device as set forth in claim 7, wherein said crystalline colloidal structure has a lattice spacing and a degree of order sufficient to Bragg diffract greater than about 90% of the intensity of a 200 Å wavelength band while passing greater than about 50% of the intensity of wavelengths adjacent said 200 Å wavelength band.

9. The device as set forth in claim 8, wherein said outer surfaces are spaced less than 1 millimeter A part.

10. The device as set forth in claim 9 wherein said crystalline colloidal structure comprises a dispersion of electrically charged particles in a selected solvent.

11. The device as set forth in claim 14, further comprising:

a plurality of said diffraction elements positionable in series in said path of said beam of incident radiation, at least some of said plurality of diffraction elements positioned at different predetermined angles to said path of said beam to diffract different narrow wavelength bands at different predeterminable angles; and a plurality of said detector means positionable to simultaneously receive said different narrow wavelength bands, said plurality of detector means including means for measuring the intensity of each of said different narrow wavelength bands.

12. The device as set forth in claim 11 further comprising:

means for focusing and directing said different narrow wavelength bands to said plurality of detector means.

13. The device as set forth in claim 12, wherein said focusing and directing means comprises an arcuate mirror member, and said device further comprises means for collimating said beam of incident radiation from radiation emitting from or passing through a sample of material to be analyzed.

14. In a system for investigating the Raman and/or emission spectrum and a selected sample, said system including a source of collimated, substantially single wavelength radiation directed toward said selected sample, an optical collection element, an optical imaging element and means for measuring the intensities of different wavelengths scattered or emitted from said selected sample, the improvement comprising:

filter means positioned between said collection element and said imaging element, said filter means including a crystalline colloidal structure having a pair of substantially planar and parallel outer surfaces and a lattice structure therebetween having lattice spacing and order sufficient to Bragg diffract more than 90% of the intensity of a narrow wavelength band from radiation incident thereon while passing greater than 50% of the intensity of wavelengths not within said narrow wavelength band, said filter means angularly positioned relative to said collection element and said imaging element to include the wavelength of said source within said narrow wavelength band diffracted by said filter means.

15. The system as set forth in claim 14, wherein said filter means includes cell means for containing said crystalline colloidal structure, and wherein said crystalline colloidal structure has a thickness less than 1 centimeter between said outer surfaces.

* * * * *